(12) United States Patent
Hains et al.

(10) Patent No.: US 6,262,811 B1
(45) Date of Patent: Jul. 17, 2001

(54) INCREASED FUNCTIONALITY FOR HOLLADAY HALFTONING

(75) Inventors: Charles M. Hains, Altadena; Gwendolyn L. Hembrock, Redondo Beach; Chan Chang, Rancho Palos Verdes, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/004,102

(22) Filed: Jan. 7, 1998

(51) Int. Cl.$^7$ .............................. B41B 15/00; H04N 1/21; H04N 1/40; H04N 1/46; G06K 9/38
(52) U.S. Cl. .......................... 358/1.9; 358/298; 358/456; 358/457; 358/534; 358/535; 358/536; 347/240; 382/270
(58) Field of Search .............................. 395/109; 358/298, 358/457, 455, 456–460, 1.9, 454, 534–536; 382/270, 252, 237, 251, 266; 347/240

(56) References Cited

U.S. PATENT DOCUMENTS

| | | | |
|---|---|---|---|
| 4,736,254 | * | 4/1988 | Kotera et al. ........................ 358/298 |
| 5,166,809 | * | 11/1992 | Surbrook .............................. 358/456 |
| 5,898,505 | * | 6/1997 | Lin et al. ............................. 358/298 |
| 6,101,002 | * | 8/2000 | Urasawa ............................... 358/456 |

* cited by examiner

Primary Examiner—Edward Coles
Assistant Examiner—Twyler Lamb
(74) Attorney, Agent, or Firm—Robert E. Cunha

(57) ABSTRACT

This is a halftone circuit which, in addition to the usual counting and addressing mechanisms, has control over the phase, angle and direction of the addressing circuitry of the array in memory so that regular dots, mirror images of dots and out-of-phase dots can be created from a single array, thus saving memory hardware. The mirror images can be made by counting rows in either direction, the angle can be varied by varying the number of pixels shifted between scans, and the phase can be varied by setting the starting point to any row and column. In this way, a single array can be used to create a number of dots.

5 Claims, 8 Drawing Sheets

INCREASED FUNCTIONALITY FOR HOLLADAY HALFTONING

BACKGROUND OF THE INVENTION

A circuit for storing halftone screen arrays which can be clocked and arranged so that a number of dots can be generated from a single Holladay brick of threshold values, the arrangement allowing a change of phase, shift and counting direction between scans.

The simplest halftone screen can be thought of as a set of threshold values stored in a memory of a printer. As a stream of multi-bit pixels is received, each is compared to its associated value in the screen, and printed either as a ONE or a ZERO. A number of types (single centered, multi-centered and stochastic) and sizes of halftone screens are required to optimally print various kinds of graphics, pictures and text. Larger screens can provide a greater number of color levels, at the expense of needing more storage. Also, in a four (or more) color printer, each separation is normally oriented at a different angle, and therefore must have its own screen. The storage of the resultant number of screens becomes a problem, and a means for reducing the memory requirement would be a significant improvement.

U.S. Pat. No. 4,185,304, Electronic Halftone Screening by Thomas M. Holladay, describes an efficient method of storing and using a screen which requires the minimum number of locations for each halftone dot, and is incorporated by reference herein. It was determined that if the minimum number of values were arranged into rows and columns, the result is a rectangle, or "brick", of numbers, each row of which of which is easily accessible to form each succeeding scan line of a halftoned image.

A large improvement would be to reduce the memory requirement by modifying the system so that one brick could be used to generate more than one halftone screen.

SUMMARY OF THE INVENTION

A normal halftoning circuit is conceptually arranged in the form of several circular shift registers, and continually compares each current pixel to an appropriate threshold to generate an output bit. To the extent that the Holladay brick has several lines, each successive scan line of video is compared to the next line in the brick. Along with this cycling to the next line, to the extent that the dots are not exactly vertical, there must also be a shift of one or more thresholds in the horizontal (fast scan) direction from one row of bricks to the next.

This invention is based on the realization that a single brick can be used to generate two or more halftone dots by varying the direction of readout from the right or left, by using a variable number of pixel shifts between scan lines and by varying the starting pixel for each scan line. In this way, a number of screens which can have complementary alignment angles and/or differing phase relationships can be made from one brick.

BRIEF DESCRIPTIONS OF THE DRAWINGS

DETAILED DESCRIPTION OF THE INVENTION

Figure 1:
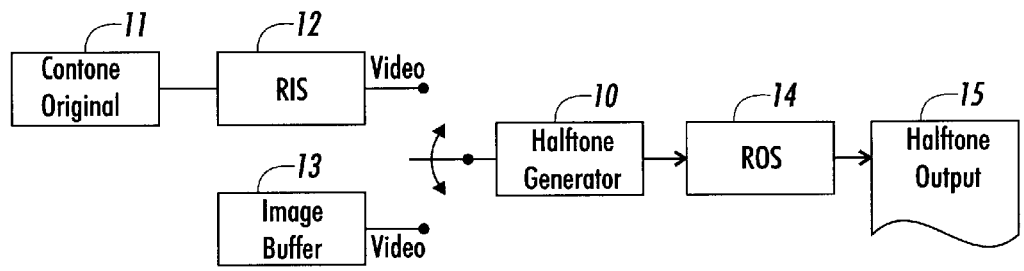
FIG. 1 is a prior art printing system for converting a contone image into halftone dots and printing or displaying the result on a raster output scanner.

FIG. 1 shows a system in which a halftone generator 10 can be used. A contone original 11 can be scanned by any commercial raster input scanner (RIS) 12 to produce a raster of pixels, each of a number of bits. The image could also be stored in an image buffer memory 13. In either case the image is transmitted as a series of pixels, one scan line at a time, to a halftone generator 10 where each group of neighboring pixels is converted into one halftone dot. The resultant series of dots are printed by a raster output scanner (ROS) printer 14 of any commercial kind onto paper as a halftone output 15, or in the alternative, is displayed on a terminal.

Figure 2:
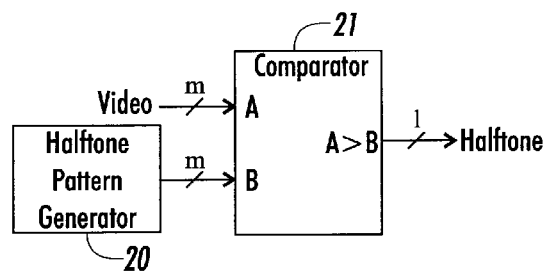
FIG. 2 shows more detail of the comparator of the halftone generator of FIG. 1.

The halftone generator is shown in more detail in FIG. 2. A halftone pattern generator 20 supplies a threshold value to the comparator 21 at the same time as each video pixel arrives, the two are compared, and a ONE or ZERO is output depending on whether the pixel is greater than the reference.

Figure 3:
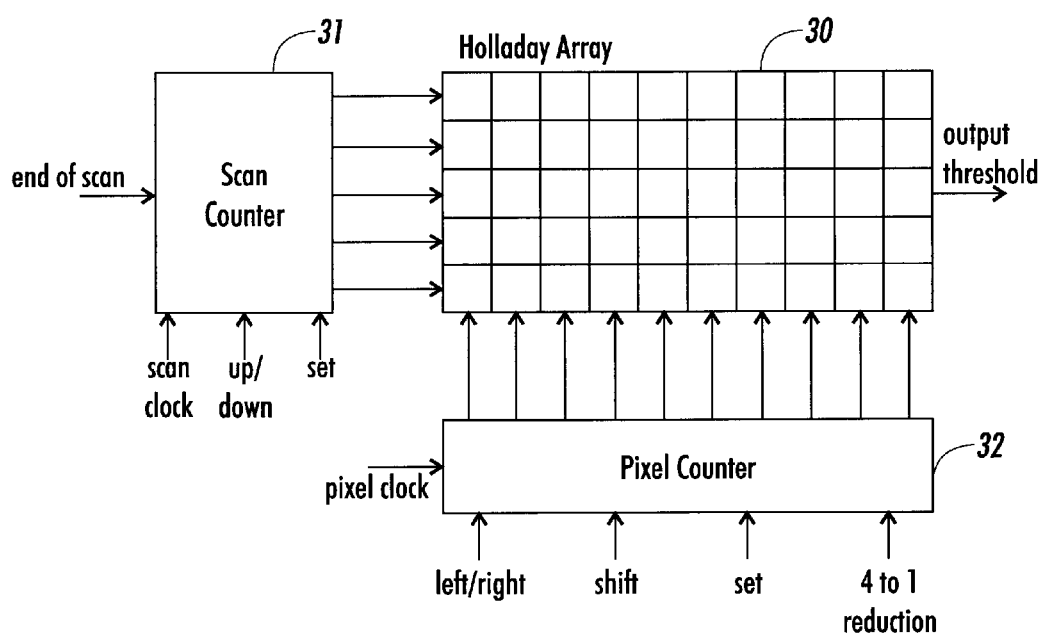
FIG. 3 shows one example of the storage of a Holladay brick in memory, and the surrounding circuitry.

FIG. 3 is one embodiment of the halftone pattern generator 10 of FIG. 2 shown in more detail. In this case the array 30 is shown as a 5 by 10 value array of threshold values arranged into rows and columns in a memory of any kind. During one scan clock period, the scan counter 31 will select one row and the pixel counter 32 will select one column of the array as the output threshold. On each scan clock thereafter, the row counter will cycle to the next row. The row counter also can initially be set to any scan line by the set line to set the phase of the dot pattern. Also, responsive to the up/down signal, the counter can count in either direction.

The pixel counter 32 cycles through the columns in response to the pixel clock, right or left in response to the left/right signal. At the end of the last scan line in a group with the height of the brick, the pixel counter will receive a control signal to indicate a shift of a number of pixels and the direction of the shift. The counter will make the correct number of shifts, and then wait for the beginning of the next scan to start selecting pixels again. In this way, the direction of vertical and horizontal cycling, and the amount and direction of shifts, is fully controllable. The counter can also be set to a particular starting pixel before the beginning of a scan by the set signal.

Figure 4:
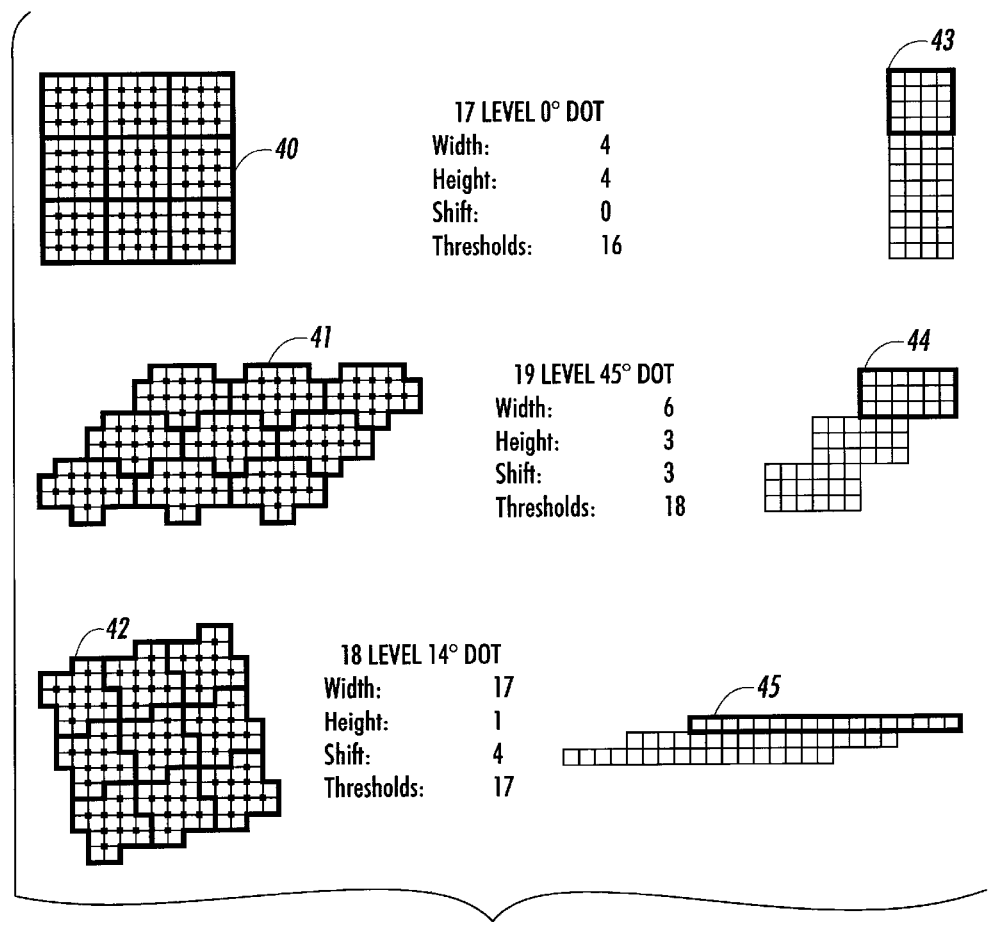
FIG. 4 shows three examples of how Holladay arrays can be used to generate various halftone dots.

FIG. 4 shows several forms of bricks and how they can be used to generate various sizes and patterns of dots. In the top row there is a 4 by 4 pixel brick 43 having 16 thresholds to provide 17 levels of color (0 to 16). Since there is no shift, each resulting visual dot pattern 40 is produced directly below the one above or directly to the right or left of the others in the row.

In the second row, the brick 44 has 3 rows and 6 columns to produce 19 levels of color. Since there is a shift of three pixels from the bottom of the first brick to the top of the next, and since the brick is 3 rows high, the angle along dot centers of the resultant dots 41 is 45 degrees as shown.

The final example at the bottom is a 1 by 17 brick 45 which can produce 18 levels of color. Since the height is 1 and the shift is 4, an angle of 14 degrees is produced between resulting dots 42.

Figure 5:
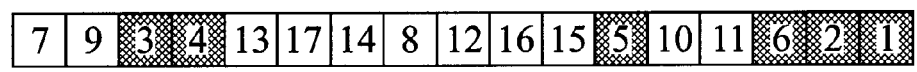
FIG. 5 is a single line of threshold values that can be used to form two or more dot patterns.
Figure 6:
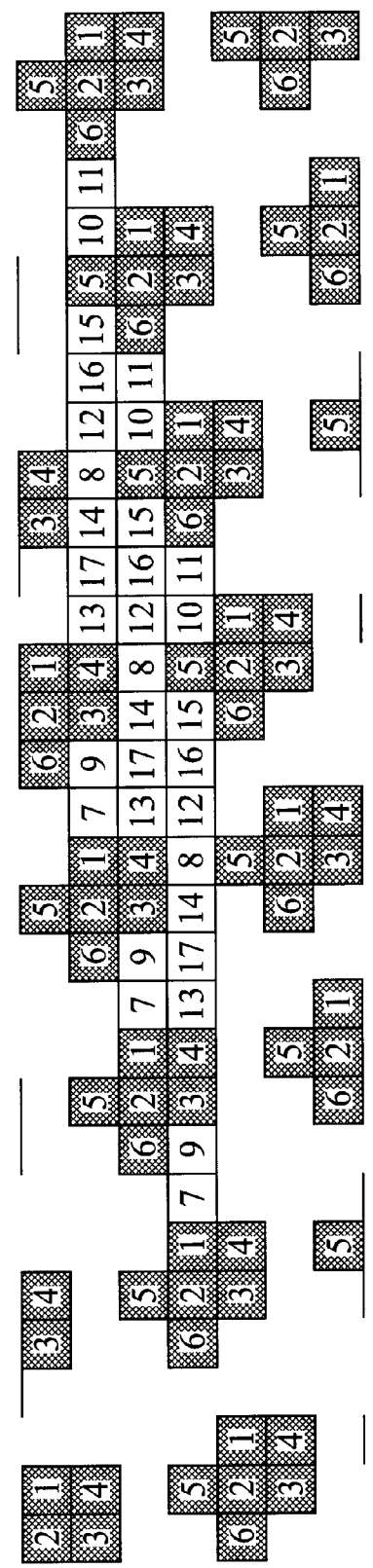
FIG. 6 is a dot pattern which counts from left to right and shifts left 4 pixels between rows of bricks to produce a 14 degree screen from the brick of FIG. 5.
Figure 7:
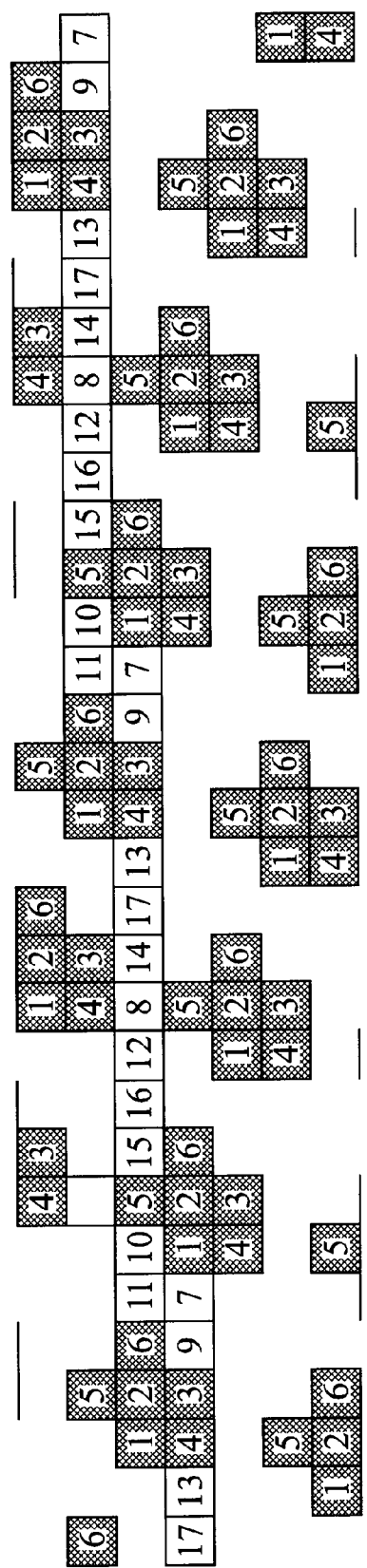
FIG. 7 is a dot pattern which counts from right to left and shifts left 13 pixels between rows of bricks to produce a 76 degree screen from the brick of FIG. 5.

FIGS. 5, 6 and 7 show how the single line brick of FIG. 5 can be used to produce two screens, shown in FIGS. 6 and 7. FIG. 5 shows a brick having one line of 17 threshold values. It is assumed that the video that is being compared to these reference values is between 6 and 7. Therefore values from 1 to 6 will be printed in black and all others will be printed in white, as shown.

On the first darkly outlined row of FIG. 6 is shown the same set of values, starting from "7", and proceeding from left to right. The next row of FIG. 6 is produced by shifting the brick 4 pixels to the left between scans, The "7" now appears one pixel below and 4 pixels to the left, resulting in a dot to dot angle of 14 degrees. For the next row, another shift of 4 pixels continues the pattern.

FIG. 7 shows how the same brick can also produce the mirror image of FIG. 6 by counting from pixel to pixel right to left (instead of left to right) and by shifting 13 to the left between scans (instead of 4 to the left) The result is now a dot to dot angle of 76 degrees. The two sets of dots can now be used for two separations in a four color printer, both being produced from the same brick to reduce memory requirements.

Figure 8:
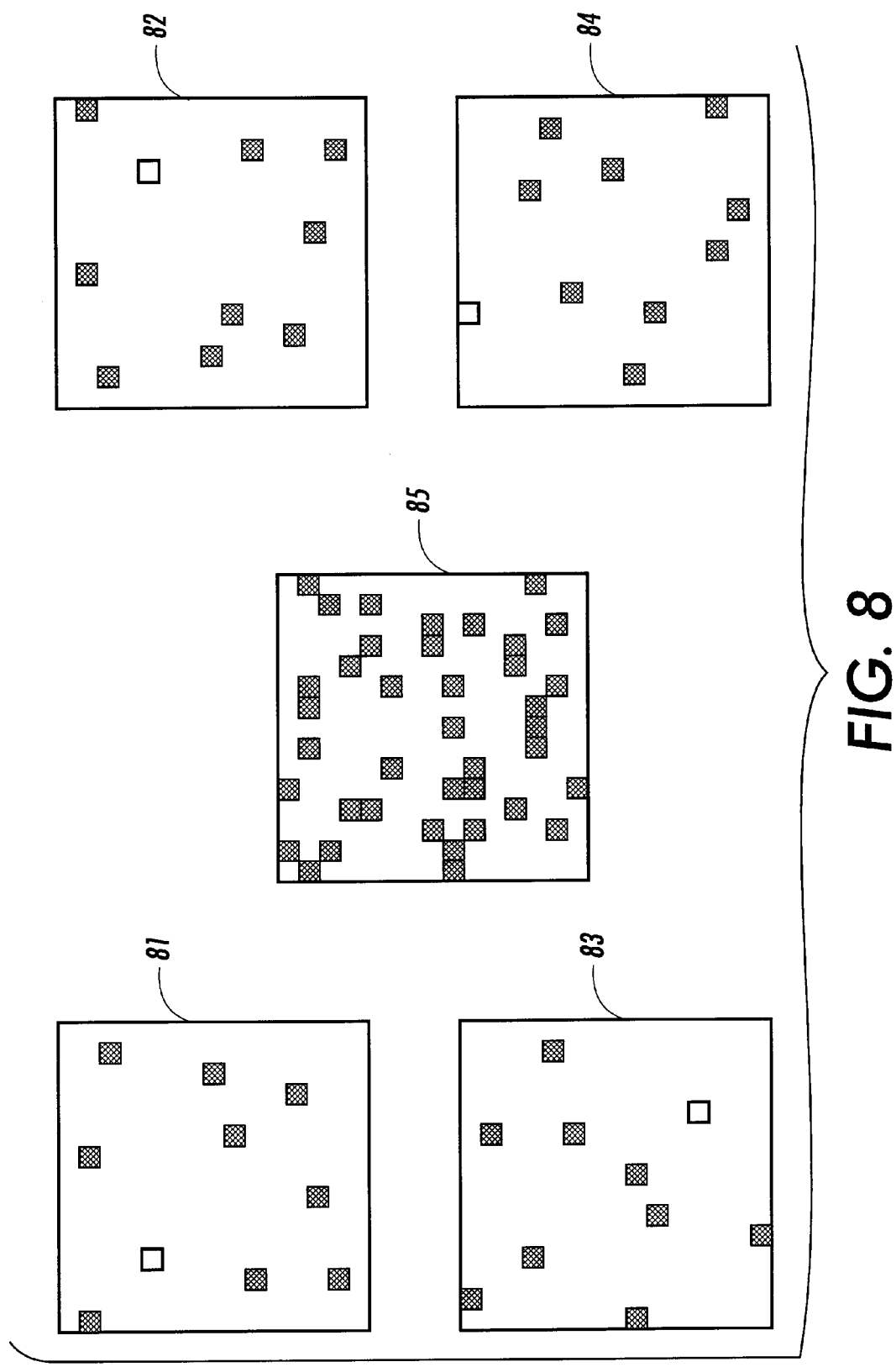
FIG. 8 shows how an original stochastic array can be used to form a mirror array, a phase-shifted array, a mirrored and phase-shifted array, and the over-laid result.

FIG. 8 shows how the same system can be used for stochastic dots. The original stochastic array 81 is shown as the first 9 black dots in an array that may be 128 by 128. Since these arrays are so large, there would be a great saving in memory if the same array could be used for the other three separations as well. This can be done by first using the original array counting from left to right. The mirror array 82 can be produced simply by counting from right to left. The phase-shifted array 83 can be produced by using the same brick and counting from left to right, but starting at a different row and column. Finally, a mirrored and phase-shifted array 84 can be made by producing the phase shifted array, but counting right to left. The four separations can now be printed to produce the over-laid result 85.

An additional consideration is that in a printer, it may be that stochastic dots will be required to be printed normally while clustered dots will need to be printed using high addressability. This is because clustered dots can use high addressability (4:1 and 8:1) in order to achieve more levels of grayscale, while stochastic screens tend to use less addressability (1:1 and 2:1) because of the extreme dot gain of isolated high-addressability pixels. Because of this, an implementation using both kinds of screens currently requires the low addressability stochastic screen to be "doubled up" to the same addressability as the other dots and the use of much more storage. The addition of a simple addressability parameter (i.e., 1, 2, 4 or 8) will allow compact storage of the stochastic screen in a high addressability implementation. The threshold array can then be clocked out redundantly by the hardware for the low addressability dots in order to allow the same hardware to be used for both kinds of dots.

Figure 9:
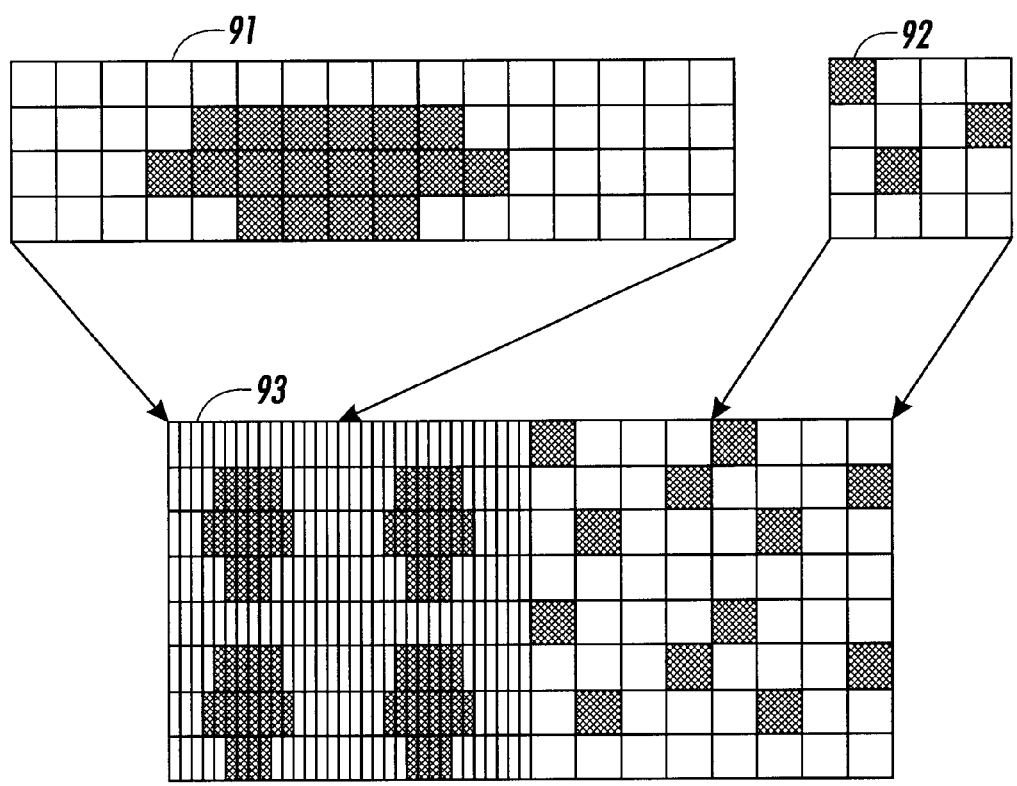
FIG. 9 shows how clustered dot and stochastic dot arrays can be stored in order to generate normal and high addressability outputs.

This is shown in FIG. 9. At the upper left is the clustered dot array 91 stored as a 16 by 4 brick, and at the upper right is the stochastic array 92 stored as a 4 by 4 brick. Four each of these dots are to be printed out as shown at the bottom of the figure. Assuming that the printer is running with a 4× high addressability clock for the clustered dots, the result is the pattern in the left half of the output. For the stochastic dot, the circuit is arranged so that the same output pixel is output 4 times for each pixel, resulting in the pattern in the right half of the output.

In terms of FIG. 3, the clock into the pixel counter 32 would be a 4× clock and when the stochastic dot is to be printed, responsive to the 4 to 1 reduction signal, the counter will only count up once for every 4 input clocks so that each pixel is output for each of 4 clock periods.

The prior art uses a constant clock and would need four times as much memory to store the stochastic dot. In this invention, a 4× clock and the non-redundant stochastic dot can be used.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A halftone circuit comprising:
   a memory containing an array of threshold values arranged in two or more rows,
   a cyclical row counter responsive to a scan clock for advancing the address to a next row in either direction, and
   a cyclical column counter responsive to a left/right signal to determine the direction of advance of addressing from one column to the next, a pixel clock to advance the addressing to the next column, and a shift signal to shift any number of columns to the right or left between scans when the row counter advances from the last row to the first row.

2. The halftone circuit of claim 1 wherein the column counter is further responsive to a set signal for addressing one column of the array.

3. The halftone circuit of claim 1 wherein the row counter is further responsive to a set signal for addressing one row of the array.

4. A halftone circuit comprising:
   a memory containing an array of threshold values arranged in one row,
   a cyclical pixel clock responsive to a left/right signal to determine the direction of advance of addressing from one pixel to the next, a pixel clock to advance the addressing to the next pixel, and a shift signal to shift any number of columns to the right or left between scans.

5. The halftone circuit of claim 1 wherein the pixel counter is further responsive to a set signal for addressing one pixel of the array.

* * * * *